J. L. MORRIS.
DIFFERENTIAL DRIVING MECHANISM FOR AUTOMOBILES.
APPLICATION FILED MAY 3, 1917.
1,279,575.
Patented Sept. 24, 1918.
2 SHEETS—SHEET 1.
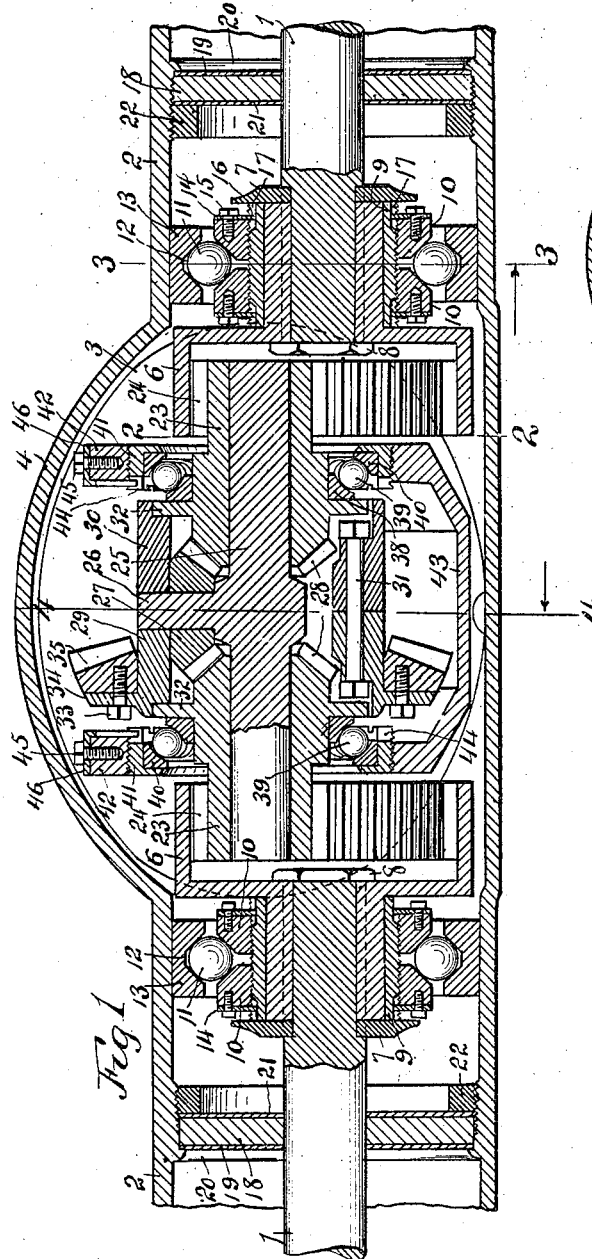
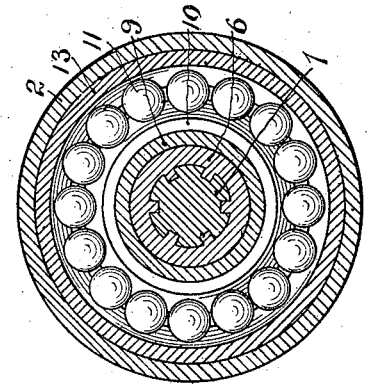
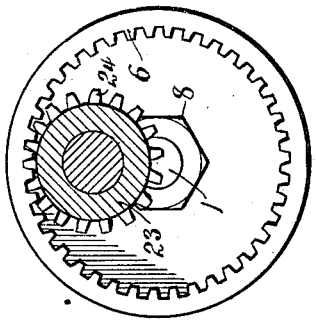
WITNESS:
R. E. Hamilton
INVENTOR.
Joseph L. Morris
BY Warren D. House
His ATTORNEY

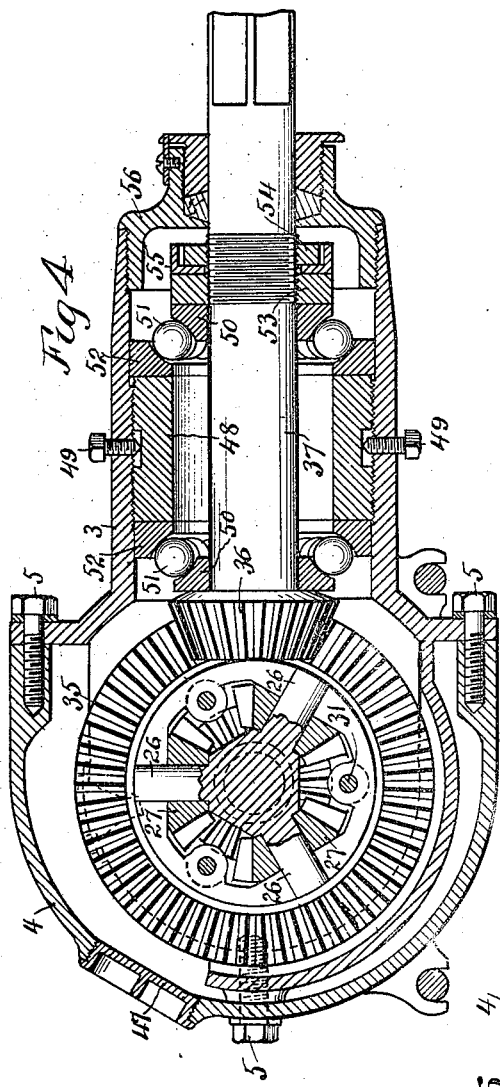
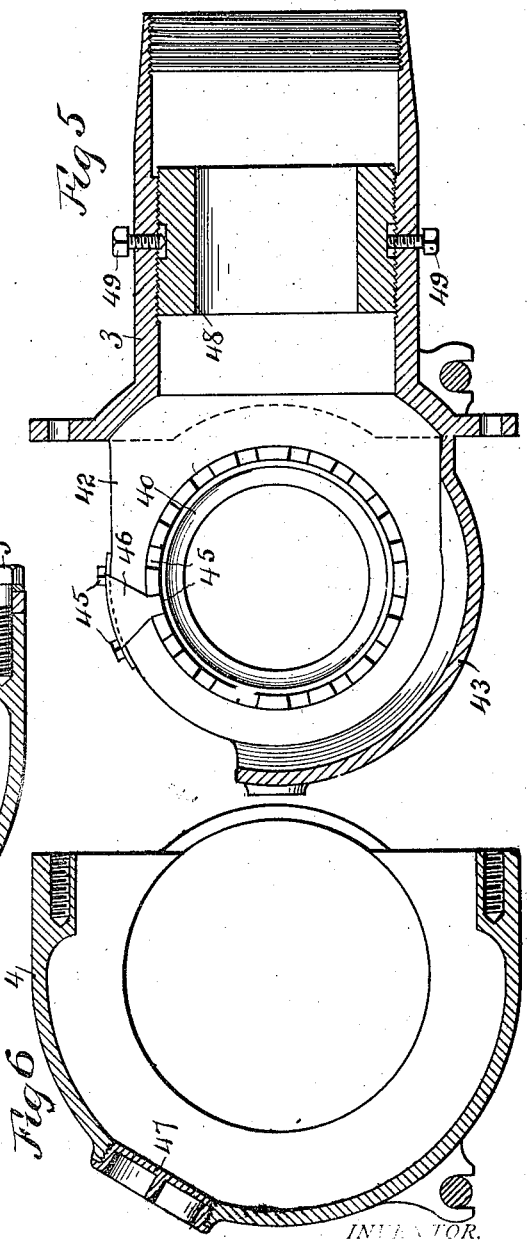

UNITED STATES PATENT OFFICE.

JOSEPH L. MORRIS, OF LAWRENCE, KANSAS.

DIFFERENTIAL DRIVING MECHANISM FOR AUTOMOBILES.

1,279,575.   Specification of Letters Patent.   Patented Sept. 24, 1918.

Application filed May 3, 1917. Serial No. 166,143.

*To all whom it may concern:*

Be it known that I, JOSEPH L. MORRIS, a citizen of the United States, residing at Lawrence, in the county of Douglas and State of Kansas, have invented a certain new and useful Improvement in Differential Driving Mechanism for Automobiles, of which the following is a specification.

My invention relates to improvements in differential driving mechanism for automobiles.

One of the objects of my invention is to provide a structure having a maximum amount of clearance between the axle housing or casing and the ground. This object I obtain by the employment of internal axle gear wheels combined with differential gearing mechanism connected therewith.

A further object of my invention is to provide differential driving mechanism of novel construction, which is exceedingly strong, of few parts, durable, not liable to get out of order, and which occupies small space.

A further object of my invention is to provide a novel housing for supporting the differential gearing mechanism, which is exceedingly strong, and which serves as a receptacle for oil in which the running parts, or portions thereof, may be immersed.

My invention provides still further novel means of adjustment of the bearings which support the differential gearing mechanism.

The novel features of my invention are hereinafter fully described and claimed.

In the accompanying drawings, which illustrate the preferred embodiment of my invention, Figure 1 is a longitudinal vertical sectional view of my improved differential driving mechanism.

Fig. 2 is a cross section on the line 2—2 of Fig. 1.

Fig. 3 is a cross section on the line 3—3 of Fig. 1.

Fig. 4 is a cross section on the line 4—4 of Fig. 1.

Figs. 5 and 6 are vertical transverse sectional views respectively of the front and rear housing members, such as in Fig. 4 are shown secured to each other.

Similar reference characters designate similar parts in the different views.

1 designates the usual two rear rotary axles of an automobile.

2 designates two end portions of an axle casing or housing in which the axles 1 are respectively rotatably mounted.

The portions 2 are connected to and are, preferably, integral with the central portion or rear housing member 4, which affords a housing for the differential gearing, in connection with a front housing member 3, which is detachably secured to the rear member 4 by screws 5, and which closes an opening in the forward side of the housing member 4, through which opening the differential gearing mechanism and some of the other parts are inserted in assembling the mechanism.

The inner end portions of the axles 1 are longitudinally grooved and have respectively fitted to them collars 7 against which respectively bear the outer ends of the hubs of two internal gear wheels 6, mounted respectively on the grooved end portions of the axles 1, and fitted thereto so as to be rotatable therewith.

The axles 1 are threaded at their inner ends and have respectively mounted thereon two nuts 8, which respectively bear against the inner ends of the gears 6.

Respectively mounted on the hubs of the gear wheels 6 are two externally threaded sleeves 9, each having fitted on it two internally threaded bearing rings 10, adjustable on the sleeve and supporting balls 11 mounted in an annular groove 12 in a bearing ring 13, which is slidable in the adjacent axle casing portion 2. Two locking rings 14 are respectively secured by screws 15 to the rings 10, the rings 14 having tongues 16 which respectively enter notches 17 provided in the periphery of the adjacent sleeve 9 at the ends thereof.

For forming an oil receptacle of the axle housing members, two felt collars 18 are respectively fitted on the axles 1 and respectively bear against two metal collars 19, the outer sides of which respectively bear against two annular flanges 20 on the inner sides respectively of the axle housing portions 2, Fig. 1. Respectively bearing against the inner sides of the collars 18 are two metal collars 21 which are respectively held in place by two externally threaded rings 22 respectively fitted in threaded portions of the housing portions 2.

The axles 1 together with the internal gear wheels 6 and the bearings supporting said gear wheels, may be moved outwardly so as to withdraw the gear wheels 6 from the gearing housing 3 and 4, for the purpose of inserting or removing the differential driving mechanism.

Two gear members 23 are provided at their outer ends with spur gear teeth 24 which respectively mesh with the internal gear wheels 6. The gear members 23 are rotatable on a horizontal shaft 25 located between and parallel with the axles 1 and having one or more radial arms 26 on which are respectively rotatable bevel gear wheels 27 which mesh with bevel gear teeth 28 provided on the inner ends of the gear members 23.

For rotating the shaft 25 suitable driving means is provided. In the form of my invention illustrated, such driving means comprises the following described parts.

Two rings 29 and 30 secured end to end by horizontal bolts 31 concentrically encircle the shaft 25 and at their abutting ends are provided with recesses for receiving the radial arms 26. The gear members 23 are provided respectively with two annular peripheral flanges 32 respectively fitted in annular grooves provided in the outer ends of the rings 29 and 30. The gear members 23 are thus held properly spaced apart, and the rings 29 and 30 are retained concentric with the shaft 25.

Secured by screws 33 to an annular peripheral flange 34 on the ring 29 is an annular gear wheel 35 having bevel teeth which mesh with a pinion 36 secured to the rear end of the driving shaft 37 of the automobile. The shaft 37 may be mounted in suitable bearings provided in the housing member 3, Fig. 4.

For supporting rotatably the gear members 23, said members have mounted on them respectively two bearing rings 38 on which run balls 39, arranged in two sets which respectively run in bearing rings 40 mounted respectively in two externally threaded rings 41, each provided with an inwardly extending flange which supports the outer side of the adjacent bearing ring 40.

The rings 41 are respectively fitted in two internally threaded ring form cheeks 42, which are preferably rearwardly extending integral portions of the housing member 3, Fig. 5. Connecting the cheeks 42 is an arcuate web 43, which with the cheeks 42 forms a core which is adapted to contain oil for the lubrication of the adjacent running parts. The web 43 further very much strengthens the core, which being preferably integral with the housing member 3, is very rigid and may be more accurately machined and cheaper to make than a built up bolted together core. This is of great importance, as the core must stand the strain of the differential driving mechanism.

The inner end of each ring 41 is provided with a circular row of notches 44. Respectively secured by screws 45 to the cheeks 42 of the core are two locking plates 46, each of which is adapted to be extended into any one of the notches 44 of the adjacent ring 41 for holding the ring from turning from the position to which it may be adjusted in the adjustment of the bearing rings 40. The rings 41 are first adjusted to their proper positions, after which the plates 46 are secured to the cheeks 42 by the screws 45.

The rear side of the housing member 4 is provided with a screw threaded hole in which is removably fitted a screw plug 47. Upon removing the plug oil may be poured into the web 43 and housing member 4. The gear wheel 35 in turning will pick up oil, which will thereby be distributed through the differential mechanism.

By employing the internal gear wheels 6 in combination with the gear members 23, differential gear wheels 27, shaft 25, and the driving gear wheel 35, carried by said shaft, a very compact and efficient differential driving mechanism is afforded, which permits of a maximum clearance between the axle or gear housing and the ground. This is a very great advantage, particularly when applied to trucks in which low reduction or slow speed is required.

With my improvement, employing the internal gear wheels 6, a reduction in speed is obtainable which is much lower than is possible to obtain, with the same ground clearance, with the use of a compound drive employing pinions and spur gear wheels.

In assembling the mechanism, the front housing member 3 is removed, and the internal gear wheels 6 and bearings therefor, and the rings 18, 19, 21 and 22, are inserted through the opening in the forward side of the housing member 4 and mounted on the axles 1. The axles together with the gear wheels 6 are then drawn outwardly, so that the gear wheels 6 clear the front opening in the housing member 4.

The shaft 25, gear members 23, bearings therefor and members 29, 30 and 35 are mounted in operative position in the cheeks 42 of the housing member 3. The shaft 37, pinion 36 and the support for the shaft 37 are mounted in the housing member 3, which is then slipped into its operative position and secured to the member 4 by the screws 5.

The axles 1, together with the gears 6 and bearings carried by the axles are slipped inwardly to positions in which the internal gear wheels will engage the gear members 23, as shown in Fig. 1.

The axles 1 may then be retained in their operative positions by any suitable means, not shown.

The screw plug 47 may then be inserted in the housing member 4 after the housings have been filled with oil between the collars 21.

Any suitable means may be used for supporting the driving axle 37 in the housing member 3. In the drawing, Fig. 4, I have shown mechanism for this purpose comprising the following described parts:—

Encircling the shaft 37 is an externally threaded ring 48 fitted to a threaded interior portion of the member 3, and held in any desired position by screws 49 mounted in the housing member 3. Mounted on the shaft 37 are two bearing rings 50 upon which respectively run two sets of balls 51 which bear respectively upon two rings 52 which bear respectively against the ends of the ring 48. A nut 52 mounted on a threaded portion of the shaft 37 bears against the front side of the bearing ring 50 adjacent thereto. A lock nut 54 on the threaded part of the shaft 37 bears against a washer 55 which bears against the front side of the nut 54. An externally threaded stuffing box 56 encircles the shaft 37 and is fitted in the screw threaded front end of the housing member 3.

I do not limit my invention to the structure shown and described, as modifications, within the scope of the appended claims, may be made without departing from the spirit of my invention.

What I claim is:—

1. In differential driving mechanism for automobiles, two rotary axles, two gear wheels respectively rotatable therewith, a rotary shaft, two gear members rotatable on said shaft and respectively meshing with said gear wheels, a rotary driving member mounted on and having driving engagement with said shaft, and differential driving means connecting said gear members and said driving member.

2. In differential driving mechanism for automobiles, two rotary axles, two gear wheels respectively rotatable therewith, a rotary shaft, two gear members rotatable on said shaft and respectively meshing with said gear wheels, a rotary driving member mounted on and having driving engagement with said shaft, and an intermediate gear wheel revoluble with said driving member and meshing with said two gear members.

3. In differential driving mechanism for automobiles, two rotary axles, two internal gear wheels respectively rotatable therewith, a rotary shaft, two gear members respectively meshing with said internal gear wheels, a driving member revoluble and having driving engagement with said shaft, and an intermediate gear wheel revoluble with said shaft and meshing with said gear members.

4. In differential driving mechanism for automobiles, two rotary axles, two internal gear wheels respectively rotatable therewith, two gear members respectively meshing with said internal gear wheels, a rotary driving member, an intermediate gear wheel meshing with said two gear members, and a rotary shaft having a radial arm on which the intermediate gear wheel is rotatable and carrying and rotatable by said driving member.

5. In differential driving mechanism for automobiles, two rotary axles, two internal gear wheels rotatable respectively therewith, two gear members respectively meshing with said internal gear wheels, bearing means rotatably supporting said gear members, a shaft rotatably mounted in said gear members, a driving member revoluble and having driving engagement with said shaft, and an intermediate gear wheel meshing with said gear members and revoluble with and rotatable on said shaft.

6. In differential driving mechanism for automobiles, two rotary axles, two gear wheels respectively rotatable therewith, bearing means, two gear members mounted on said bearing means and respectively meshing with said gear wheels, a shaft rotatably mounted in said two gear members and having a radial arm, a driving member revoluble and having driving engagement with said shaft, and an intermedite gear wheel rotatable on said arm and meshing with said two gear members.

7. In differential driving mechanism for automobiles, two rotary axles, two internal gear wheels respectively rotatable therewith, two gear members respectively meshing with said internal gear wheels, bearings supporting said two gear members, a shaft rotatably mounted in said gear members and having a radial arm, a driving member revoluble and having driving engagement with said shaft, and an intermediate gear wheel rotatable on said arm and meshing with said gear members.

8. In differential driving mechanism for automobiles, an axle housing having a core provided with two cheeks of ring form and an arcuate web connecting the cheeks, bearings respectively mounted in said cheeks, and differential gearing mechanism supported by said bearings.

9. In differential driving mechanism for automobiles, an axle housing having a core provided with two cheeks of ring form and an arcuate web connecting the cheeks and having its concave side up and adapted to serve as a receptacle for oil, the cheeks having means for supporting bearings.

10. In differential driving mechanism for automobiles, an axle housing having a core provided with two ring form cheeks each of which is internally screw threaded, and an arcuate web connecting the cheeks, two externally threaded bearing members respectively fitted in said cheeks, and releasable means for locking the bearing members in positions to which they may be adjusted in said cheeks.

11. In differential driving mechanism for automobiles, an axle housing having a core provided with two parallel ring form cheeks and a web connecting the cheeks and arranged with the cheeks to serve as an oil receptacle, the cheeks having means for supporting differential gearing mechanism.

12. In differential driving mechanism for automobiles, an axle housing having a core provided with two internally threaded ring form cheeks, and an arcuate web connecting said cheeks and arranged with said cheeks to form an oil receptacle, two externally threaded bearing members respectively fitted in said cheeks, releasable means for locking said bearing members in the positions to which they may be adjusted, two bearings respectively mounted in said bearing members, and differential gearing mechanism supported by said bearings.

13. In differential driving mechanism for automobiles, an axle housing having a core provided with two cheeks of ring form, two gear members, a shaft rotatable in and supported by said gear members and provided with a radial arm, two bearing means respectively mounted in said cheeks and respectively supporting said gear members, an intermediate gear wheel meshing with said gear members and rotatable on said arm, and a driving member encircling said shaft and mounted on said arm and revoluble therewith.

14. In differential driving mechanism for automobiles, a rotary shaft having a radial arm, two gear members rotatable on and supporting said shaft, a gear wheel connecting said gear members, an annular driving member encircling said gear members and engaged thereby so as to be held from longitudinal movement, and engaging said arm so as to be revoluble with said shaft, bearing means supporting said gear members, and two axle gears respectively engaging said gear members.

15. In differential driving mechanism for automobiles, two rotary axles, two internal gear wheels respectively secured thereto, two gear members respectively meshing with said internal gear wheels, bearing means supporting said gear members, a rotary shaft rotatable in and supported by said gear member and having a radial arm, an annular driving member encircling said shaft and revoluble therewith and held by said gear members from longitudinal movement, and an intermediate gear wheel rotatable on said arm and meshing with said gear members.

16. In differential driving mechanism for automobiles, two gear members, bearing means supporting said members, a shaft rotatable in and supported by said members and having a radial arm, a driving member encircling said gear members and held thereby from longitudinal movement and revoluble with said shaft, and an intermediate gear wheel rotatable on said arm meshing with said gear members.

17. In differential driving mechanism for automobiles, a rotary shaft, a driving member encircling and revoluble with said shaft, two gear members rotatable on and supporting said shaft and provided respectively with two peripheral flanges respectively engaging opposite ends of said driving member for holding the latter from endwise movement, an intermediate gear wheel meshing with said gear members, two bearing means respectively supporting said gear members and adjustable toward and from each other, two rotary axles, and two gear wheels respectively rotatable with said axles and respectively meshing with said gear members.

18. In differential driving mechanism for automobiles, a rotary shaft having a radial arm, two gear members rotatable on said shaft, driving means encircling and revoluble and having driving engagement with said shaft, and an intermediate gear wheel meshing with said gear members and rotatable on said arm.

19. In differential driving mechanism for automobiles, a shaft, two gear members rotatable thereon, two bearing means respectively supporting said gear members and adjustable toward and from each other, a driving member revoluble on the axis of said shaft, and an intermediate gear wheel meshing with said gear members and revoluble with said driving member and rotatable on an axis disposed radially to said shaft.

20. In differential driving mechanism for automobiles, a shaft, two gear members rotatable thereon, a driving member revoluble with respect to said gear members, an intermediate gear wheel revoluble with said driving member and meshing with said gear members and rotatable on an axis disposed radially to the axis of the driving member, a support, and two bearing means respectively supporting said gear members and including two rings adjustable toward and from each other on said support.

21. In differential driving mechanism for automobiles, a rotary shaft, having a radial arm, two gear members rotatable thereon and having each a peripheral flange, an annular driving means encircling said shaft and revoluble therewith and engaging said flanges for holding the gear members spaced apart, and an intermediate gear wheel rotatable on said arm and meshing with said gear members.

22. In differential driving mechanism for automobiles, a shaft, two gear wheels rotatable thereon, two bearing means respectively supporting said gear wheels, an annular driving means encircling said shaft and revoluble with respect to said gear wheels and engaging the latter for holding them spaced apart, and an intermediate gear wheel meshing with said gear wheels and revoluble with said driving means and rotatable on an axis disposed radially to the axis of the driving means.

23. In differential driving mechanism for automobiles, a rotary shaft having a radial arm, two gear members rotatable thereon, a revoluble driving member encircling said shaft and engaging said arm and engaging said gear members for holding the latter spaced apart, an intermediate gear wheel meshing with said gear members and rotatable on said arm, bearing means respectively supporting said gear members, two rotary axles, and two internal gear wheels respectively rotatable with said axles and respectively meshing with said gear members.

24. In differential driving mechanism for automobiles, a rotary shaft having a radial arm, two gear members rotatable on said shaft, bearing means supporting said gear members, a support on which the bearing means are adjustable toward and from each other, an annular driving means encircling said shaft and engaging said arm and revoluble therewith, an intermediate gear wheel meshing with said gear members, two rotary axles, and two internal gear wheels respectively rotatable with the axles and respectively meshing with said gear members.

In testimony whereof I have signed my name to this specification.

JOSEPH L. MORRIS.